United States Patent
Hagihara et al.

(10) Patent No.: US 8,393,892 B2
(45) Date of Patent: Mar. 12, 2013

(54) BURNER FOR PRODUCTION OF INORGANIC SPHEROIDIZED PARTICLE

(75) Inventors: Yoshiyuki Hagihara, Kofu (JP); Kazuro Suzuki, Nirasaki (JP); Shinichi Miyake, Kai (JP); Yasuyuki Yamamoto, Hokuto (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 348 days.

(21) Appl. No.: 12/602,408

(22) PCT Filed: May 30, 2007

(86) PCT No.: PCT/JP2007/061008
§ 371 (c)(1),
(2), (4) Date: Nov. 30, 2009

(87) PCT Pub. No.: WO2008/146373
PCT Pub. Date: Dec. 4, 2008

(65) Prior Publication Data
US 2010/0167054 A1    Jul. 1, 2010

(51) Int. Cl.
*F23D 14/24*    (2006.01)
(52) U.S. Cl. ............ 431/181; 431/185; 431/354; 431/8; 264/15; 422/307; 428/402
(58) Field of Classification Search ................. 431/181, 431/185, 354, 8; 264/15; 422/307; 428/402
See application file for complete search history.

(56) References Cited

U.S. PATENT DOCUMENTS 5,743,930 A    4/1998    Miyake

FOREIGN PATENT DOCUMENTS

| JP | 58-145613 | 8/1983 |
| JP | 62-241543 | 10/1987 |
| JP | 10-325532 | 12/1998 |
| JP | 2000-205523 | 7/2000 |
| JP | 3312228 | 8/2002 |
| JP | 3331491 | 10/2002 |

OTHER PUBLICATIONS

International Search Report for PCT/JP2007/061008, mailed Aug. 14, 2007.
Official Action (and English translation) in JP 2009-516110 dated Nov. 8, 2011.

*Primary Examiner* — Alfred Basichas
(74) *Attorney, Agent, or Firm* — Nixon & Vanderhye P.C.

(57) ABSTRACT

A burner for production of inorganic spheroidized particles according to the present invention includes a raw material powder supply path that supplies raw material powder by using oxygen or an oxygen-enriched air as a carrier gas; a powder diffusion plate having a plurality of fine holes, which is provided at a downstream end of the raw material powder supply path; a raw material diffusion chamber that is formed in a diffusion pipe provided at a downstream end of the powder diffusion plate; a fuel supply path disposed around the outer circumference of the raw material powder supply path; an oxygen supply path disposed around the outer circumference of the fuel supply path; and a combustion chamber disposed at a downstream side of the raw material diffusion chamber, which has an inside diameter increasing along the downstream direction and communicates with the fuel supply path and the oxygen supply path.

6 Claims, 3 Drawing Sheets

BURNER FOR PRODUCTION OF INORGANIC SPHEROIDIZED PARTICLE

This application is the U.S. national phase of International Application No. PCT/JP2007/061008, filed 30 May 2007, which designated the U.S., the entire contents of which is hereby incorporated by reference.

TECHNICAL FIELD

The present invention relates to a burner used for production of inorganic spheroidized particles, a production apparatus of inorganic spheroidized particles which uses the burner, a production method of inorganic spheroidized particles which uses the production apparatus, and a spheroidized particle obtained by the production apparatus.

BACKGROUND ART

An inorganic spheroidized particle is obtained by the method in which crushed raw material powder is melted in high-temperature flame and spheroidized by its surface tension. For example, highly-pure spheroidized silica that is obtained by using silica as a raw material is widely used as a filler for an epoxy-sealing material of a semiconductor device, and a lot of merits such as improved fluidity of a filler, high filling quantity, and improved abrasion resistance can be obtained by spheroidizing. In the present specification, an inorganic spheroidized particle may be simply described as a spheroidized particle.

As a prior art regarding the production of an inorganic spheroidized particle, there are the methods disclosed in Patent Documents 1 to 4. Because high-temperature flame is needed for the spheroidizing of raw material powder, a burner of an oxygen-gas combustion system is usually used.

Examples of the burner include a premixing type burner and a diffusion type burner. In a premixing type burner, oxygen and a combustion gas are preliminarily mixed and ejected to the combustion place. Meanwhile, in a diffusion type burner, oxygen and a combustion gas are separately ejected and mixed at the combustion place. Patent Document 2 discloses a premixing type burner, and Patent Documents 1, 3, and 4 disclose a diffusion type burner.

The diffusion type burner disclosed in Patent Document 1 has the concentric double pipe in which a lot of small pipes are provided between the inner pipe and the outer pipe. This burner is disposed in a vertical furnace, a silicon raw material is flowed down spontaneously (or with pressurization) through the central pipe (i.e. inner pipe) of the burner, and the raw material powder is supplied into flame made by a combustible gas from the small pipes and an oxygen gas from the outer pipe, to thereby produce a melted silica spheroidized body.

In the premixing type burner disclosed in Patent Document 2, raw material powder, oxygen, and LPG are sufficiently mixed, and the raw material powder is supplied into flame made at the end of the burner.

The diffusion type burners disclosed in Patent Documents 3 and 4 have the concentric quartet pipe structure in which raw material powder is supplied through the central pipe into the combustion chamber by using oxygen or an oxygen-enriched air as a carrier gas, a fuel gas is supplied through the outer circumference thereof, the primary oxygen and the secondary oxygen are supplied through the further outer circumference thereof, and cooling water path is provided around the most outer circumference, to thereby cool a burner.

In addition, Patent Documents 3 and 4 disclose the production apparatus that uses the diffusion type burner to produce inorganic spheroidized particles.

In the production apparatus of inorganic spheroidized particles disclosed in Patent Document 4, as illustrated in FIG. 3, raw material powder is cut off from the conventional raw material feeder A, and carried to the burner B with a carrier gas that is supplied through the line A'. Into the burner B, oxygen from the oxygen supplier C and a combustible gas from a LPG supplier D are supplied. The particles, which are spheroidized within flame in the vertical burner E, are subjected to the temperature dilution with the air introduced into the vertical burner E through the line F, and collected by the following cyclone G and bag filter H.

[Patent Document 1]
Japanese Unexamined Patent Application, First Publication No. Sho 58-145613
[Patent Document 2]
Japanese Unexamined Patent Application, First Publication No. Sho 62-241543
[Patent Document 3]
Japanese Patent No. 3331491
[Patent Document 4]
Japanese Patent No. 3312228

DISCLOSURE OF INVENTION

Problems to be Solved by the Invention

In the premixing type burner disclosed in Patent Document 2, oxygen and a fuel fluid such as LPG are preliminarily mixed in the burner. In this type of the burner, the mixture of the combustion-assisting gas and the combustible gas are ejected from the end of the nozzle, and therefore, there is a possibility of backfire into the burner.

Meanwhile, in the diffusion type burner disclosed in Patent Document 1, there is no possibility of backfire, but the raw material ejection hole and the fuel ejection hole are adjacent, and therefore, raw material particles are ejected into the low-temperature fuel gas that is not mixed well with oxygen. For this reason, the problems were found in which the sufficient heating due to the oxygen combustion flame could not be achieved and the melting state was insufficient.

On the other hand, raw material powder is heated and melted in flame by forced convective heat transfer mainly due to the flame, and is spheroidized by its surface tension. In the diffusion type burners disclosed in Patent Documents 3 and 4, the combustion chamber is provided, and the aggregation state of the produced inorganic spheroidized particles is improved in comparison with the burner disclosed in Patent Document 1.

However, when raw material powders with various mean particle diameters were spheroidized in the same combustion amount, the tendency was found in which as the mean particle diameter decreased, the aggregation was enhanced and the spheroidizing quantity decreased. In addition, the tendency was found in which the mean particle diameter of the spheroidized particles processed by the flame became larger than the mean particle diameter of the raw material powder.

Therefore, it was found that the burners disclosed in Patent Documents 3 and 4 were insufficient to obtain the spheroidized particles with smaller mean particle diameter.

An object of the present invention is to provide a burner for production of inorganic spheroidized particles which has no possibility of backfire, can realize the efficient production of inorganic spheroidized particles, and can perform the spheroidizing with corresponding to a mean particle diameter of raw material powder.

Means to Solve the Problems

The present inventors found the aggregation state is the reason why spheroidizing quantity decreases and the mean particle diameter of the spheroidized particles processed by flame is higher than the mean particle diameter of the raw material powder. In specific, the raw material powder is in an aggregation state within a raw material supply pipe. In the stage where the raw material powder is supplied into the combustion chamber, this aggregation state is cleared. In other words, the diffusion of the raw material powder starts. Then, the diffused raw material powder is heated and spheroidized. Therefore, when the diffusion of the raw material powder is insufficient in the combustion chamber, the raw material powder is fused, and the particle diameter of the obtained spheroidized particle increases. For example, the raw material ejection hole and the fuel ejection hole are disposed on the same plane in the burners disclosed in Patent Documents 3 and 4, and therefore, the diffusion of the raw material powder in the combustion chamber seems to have been insufficient. The present inventors completed the present invention on the basis of the aforementioned knowledge.

In other words, the first aspect of the present invention is a burner for production of inorganic spheroidized particles, including:

a raw material powder supply path that supplies raw material powder by using oxygen or an oxygen-enriched air as a carrier gas;

a powder diffusion plate having a plurality of fine holes, which is provided at a downstream end of the raw material powder supply path;

a raw material diffusion chamber that is formed in a diffusion pipe provided at a downstream end of the powder diffusion plate;

a fuel supply path disposed around the outer circumference of the raw material powder supply path;

an oxygen supply path disposed around the outer circumference of the fuel supply path; and a combustion chamber disposed at a downstream side of the raw material diffusion chamber, which has an inside diameter increasing along the downstream direction and communicates with the fuel supply path and the oxygen supply path, wherein the oxygen supply path has a plurality of first oxygen ejection holes that eject oxygen from the side wall of the combustion chamber in such a direction that forms rotational flow in the combustion chamber, and a plurality of second oxygen ejection holes that are disposed at a downstream side of the first oxygen ejection holes and eject oxygen from the side wall of the combustion chamber in a direction parallel to a central axis of the burner.

In the present invention, it is preferable that the burner further include a controller that controls a supply quantity of the oxygen within the oxygen supply path, the oxygen supply path include primary oxygen supply path communicating the first oxygen ejection holes and secondary oxygen supply path communicating the second oxygen ejection holes, and the controller separately control the supply quantities of oxygen within the primary oxygen supply path and the secondary oxygen supply path.

Also, in the present invention, it is preferable that the fine holes formed in the powder diffusion plate be formed in a radial manner along the downstream direction.

A second aspect of the present invention is a production apparatus of inorganic spheroidized particles, including: a vertical furnace that is equipped with the burner for production of the inorganic spheroidized particles of the first aspect of the present invention at the top part in a vertically downward direction; and a cyclone and a bag filter that are disposed at a downstream side of the vertical furnace.

A third aspect of the present invention is a production method of inorganic spheroidized particles, which uses the burner for production of the inorganic spheroidized particles of the first aspect of the present invention, to produce the inorganic spheroidized particles, wherein a flow rate ratio between a primary oxygen and a secondary oxygen is adjusted so that the flow rate ratio of the primary oxygen is lower than 50%, to obtain the inorganic spheroidized particles whose vitrification percentage is 98% or more.

A fourth aspect of the present invention is a production method of inorganic spheroidized particles, which uses the production apparatus of the inorganic spheroidized particles according to the second aspect of the present invention, to collect coarse particles by the cyclone that is disposed at the downstream side of the vertical furnace and to collect fine particles by the bag filter that is disposed at the downstream side of the cyclone.

In the present invention, the coarse particle refers to a particle with a particle diameter exceeding about 10 µm, and the fine particle refers to a particle with a particle diameter about 10 µm or less.

A fifth aspect of the present invention is an inorganic spheroidized particle obtained by the production method of the inorganic spheroidized particles of the present invention.

Effect of the Invention

A burner for production of inorganic spheroidized particles of the present invention is a diffusion type burner in which fuel and oxygen are mixed and combusted in the combustion chamber, and therefore, backfire does not occur. Moreover, raw material powder is supplied by using oxygen or an oxygen-enriched air as a carrier gas, and therefore, it can be suppressed that leak occurs due to usual abrasion of the pipe. Accordingly, a burner of the present invention is highly safe and easy to handle.

Also, the present invention uses both of the powder diffusion plate and the raw material diffusion chamber. Therefore, when the raw material powder is ejected from a plurality of small holes (i.e. raw material ejection holes) formed in the powder diffusion plate, the aggregation state of the raw material powder is cleared, and the raw material powder is well diffused in the raw material diffusion chamber. Then, the raw material powder is supplied into the combustion chamber while keeping this diffusion sate. Therefore, the diffusion state of the raw material powder within the flame is good, and the fusion of the raw material powder is suppressed. In other words, it is suppressed to produce spheroidized particles with a large particle diameter, and it is possible to obtain the spheroidized particles that have the almost same particle diameter as the raw material powder. In addition, the decrease in spheroidizing quantity is prevented.

Also, in the present invention, the second oxygen ejection holes eject oxygen in a direction parallel to a central axis of the burner. Therefore, it is possible to form the optimal flame that does not inhibit the diffusion effect for the raw material powder due to the powder diffusion plate and the raw material diffusion chamber. In addition, the supply quantities of oxygen within the primary oxygen supply path and the secondary oxygen supply path can be separately controlled, and therefore, the combustion state can be optimally adjusted during the production of the spheroidized particles.

DESCRIPTION OF THE REFERENCE SYMBOLS 1A represents a raw material supply path, 2 represents a powder diffusion plate, 4A represents a raw material diffusion chamber, 5A represents a fuel supply path, 5B represents a fuel ejection hole, 6A represents a primary oxygen supply path, 6B represents a first oxygen ejection hole, 7A represents a secondary oxygen supply path, 7B represents a secondary oxygen ejection hole, 8 represents a combustion chamber, 6D and 7D represent a flow rate regulating valve, and 10 represents an oxygen supply quantity control section.

BEST MODE FOR CARRYING OUT THE INVENTION

Figure 1:
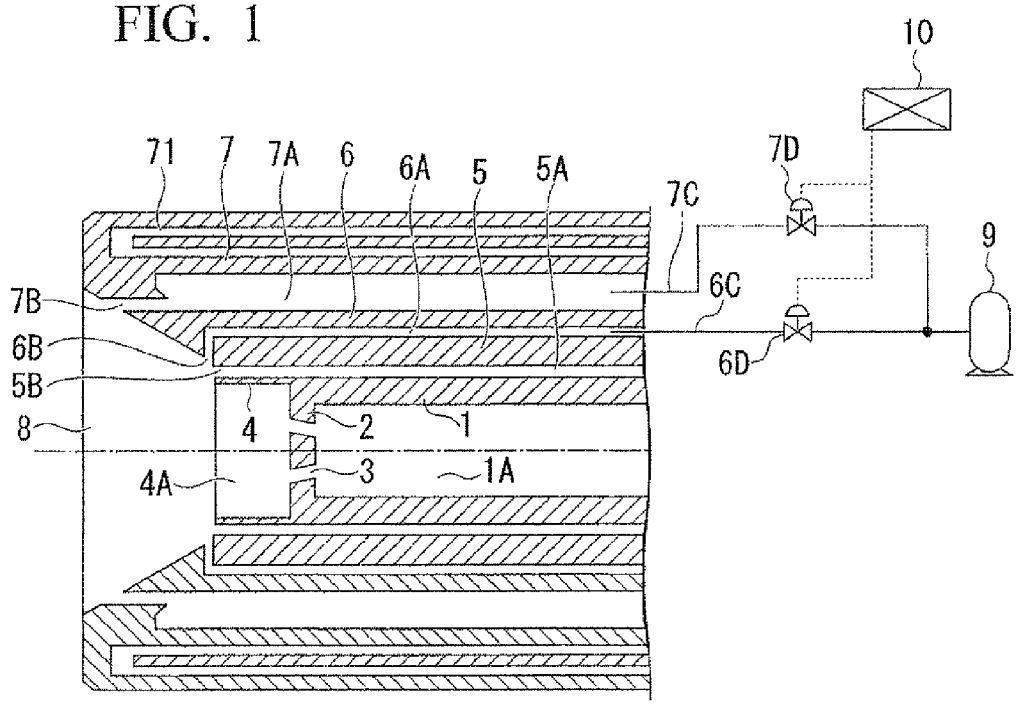
FIG. 1 is a schematic cross-sectional view representing an example of the burner of the present invention.
Figure 2:
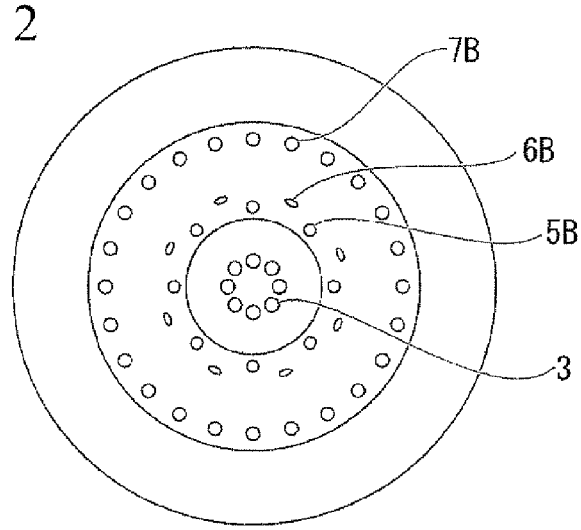
FIG. 2 is a schematic side view representing an example of the burner of the present invention.

FIG. 1 and FIG. 2 illustrate an example of the burner of the present invention (hereinafter may be simply referred to as a burner). FIG. 1 is a cross-sectional view in which the burner is cut along the central axis thereof. FIG. 2 is a side view when the burner is looked at from the end side thereof, which illustrates only the ejection holes for raw material powder, fuel, and oxygen.

In these figures, the reference symbol of 1 represents a raw material supply pipe whose inside forms the raw material supply path 1A through which the mixture of raw material powder and a carrier gas is supplied. Examples of a carrier gas include oxygen or an oxygen-enriched air whose oxygen content is 20 vol % or more. Examples of raw material powder include inorganic powder such as silicon oxide, aluminium oxide, or glass, in which the particle morphology is a non-spherical shape with a corner.

In FIG. 1, raw material powder flows from right side to left side.

The raw material supply pipe 1 is integrally equipped with the powder diffusion plate 2 at the downstream end thereof. This powder diffusion plate 2 ejects the mixed powder of the raw material powder and the carrier gas so that it spreads in a radial manner along the downstream direction. A plurality of small holes 3, 3 . . . , which are directed obliquely outward, are formed on a circle at regular intervals. In the present invention, a small hole is equivalent to a raw material ejection hole.

The powder diffusion plate 2 is integrally equipped with the diffusion pipe 4 at the downstream end thereof. This diffusion pipe 4 and the aforementioned powder diffusion plate 2 form the raw material diffusion chamber 4A. This raw material diffusion chamber 4A provides the space in which the raw material powder ejected from the small holes 3, 3 . . . can be diffused sufficiently.

There is no restriction to the shape of the diffusion pipe 4 as long as it can form the raw material diffusion chamber 4A in which the raw material powder can be diffused sufficiently. Examples of the shape include the same shape as the raw material supply pipe 1 and the shape that broadens in a radial manner along the downstream direction in the same manner as the small holes 3, 3 . . . , but the present invention is not limited to these examples.

The length of the diffusion pipe 4 in the central axis thereof needs to be adjusted appropriately because if the length is too long, the raw material powder ejected from the small holes 3, 3 . . . contacts the diffusion pipe 4, resulting in the inhibition of the diffusion effect. The specific length varies according to the scale and shape of the burner, and can be determined by a person skilled in the art in consideration of total balance.

The temperature inside the raw material diffusion chamber 4A needs to be adjusted lower than the melting point of the raw material powder in order to prevent the fusion of the raw material powder. Examples of a temperature adjustment method include the method in which the flow rate of the carrier gas is adjusted lower than the flow rate of fuel forming flame, to thereby lower the combustion temperature. By this adjustment, it is possible to prevent the temperature inside the raw material diffusion chamber 4A from reaching the melting point of the raw material powder even if fuel is flowed into the raw material diffusion chamber 4A and flame is made.

Regarding the flow rate of the carrier gas, the optimal value exists according to the quantity of the raw material powder. Therefore, when the flow rate of the carrier gas is adjusted for the adjustment of the temperature inside the raw material chamber 4A, it is preferable that the adjusted flow rate do not deviate widely from the optimal value.

Outside the raw material pipe 1, the fuel supply pipe 5 is provided concentrically, and the space between the raw material supply pipe 1 and the fuel supply pipe 5 forms the fuel supply path 5A. Through this fuel supply path 5A, gaseous fuel such as LPG is supplied. The exit end of the fuel supply path 5A forms a plurality of fuel ejection holes 5B, 5B . . . so that fuel is ejected in a direction parallel to the central axis of the burner. The plurality of fuel ejection holes 5B, 5B . . . are formed on a circle at regular intervals, Outside the fuel supply pipe 5, the primary oxygen supply pipe 6 is provided concentrically, and the space between the fuel supply pipe 5 and the primary oxygen supply pipe 6 forms the primary oxygen path 6A. The exit part of the primary oxygen supply path 6A is almost orthogonally bent and forms a plurality of first oxygen ejection holes 6B, 6B . . . so that oxygen is orthogonally ejected toward the central axis of the burner and the rotational flow is formed in the combustion chamber 8.

The plurality of first oxygen ejection holes 6B, 6B . . . are formed on a circle at regular intervals, and each of the first oxygen ejection holes 6B is disposed in the almost middle between the adjacent two fuel ejection holes 5B.

Outside the primary oxygen supply pipe 6, the secondary oxygen supply pipe 7 is provided concentrically, and the space between the primary oxygen supply pipe 6 and the secondary oxygen supply pipe 7 forms the secondary oxygen supply path 7A. This secondary oxygen supply path 7A has the wider cross-section than the primary oxygen supply path 6A so that a large quantity of oxygen can be supplied. The exit end of the secondary oxygen supply path 7A forms a plurality of second oxygen ejection holes 7B, 7B . . . so that oxygen is ejected in a direction parallel to the central axis of the burner.

The plurality of second oxygen ejection holes 7B, 7B . . . are formed on a circle at regular intervals.

FIG. 1 illustrates the example in which the first oxygen ejection holes and the second oxygen ejection holes communicate the primary oxygen supply path 6 and the secondary oxygen supply path 7, respectively. However, the present invention includes the example in which the first oxygen ejection holes and the second oxygen ejections holes communicate the common oxygen supply path.

Moreover, the secondary oxygen supply pipe 7 has a thick pipe wall in which the cooling water path 71 is formed to cool the burner itself.

In addition, the end part of the burner is dented in a mortar shape that broadens outward, and this part forms the combustion chamber 8. In other words, the inclined pipe wall part of the combustion chamber 8 is constituted by obliquely forming the end parts of the secondary oxygen supply pipe 7 and the primary oxygen supply pipe 6. Also, the bottom part of the combustion chamber 8 corresponds to the downstream end of the raw material diffusion chamber 4A.

To the primary oxygen supply path 6A and the secondary oxygen supply path 7A, the pipes 6C, 7C are respectively connected, through which oxygen is flowed from the oxygen feeder 9. In these pipes 6C, 7C, the flow rate regulating valves 6D, 7D are provided, which detect and regulate the supply quantity of oxygen. In these flow rate regulating valves 6D, 7D, the openings are controlled in accordance with the control signal from the oxygen supply quantity control section 10 so that the supply quantities of oxygen into the primary oxygen supply path 6A and the secondary oxygen supply path 7A are independently regulated. In this way, the flow rate regulating valves 6D, 7D and the oxygen supply quantity control section 10 constitute the control device that regulates a supply quantity of oxygen.

Regarding the supply quantity of oxygen in the combustion chamber 8, the optimal value exists according to the supply quantity of fuel. In other words, there is an optimal ratio between the supply quantities of oxygen and fuel to form good flame without producing soot. Therefore, the sum of the supply quantities of the primary oxygen and the secondary oxygen is optimally determined in consideration of the supply quantity of fuel and the supply quantity of oxygen in the carrier gas.

The burner for production of the inorganic spheroidized particles of the present invention has the aforementioned structure, and therefore, the raw material powder is diffused well through the raw material plate 2 and the raw material diffusion chamber 4A, and is supplied into the combustion chamber 8 while keeping this diffusion sate. Accordingly, the diffusion state of the raw material powder within the flame is good, and the fusion of the raw material particles is suppressed.

Also, in the present invention, the second oxygen ejection holes eject oxygen in a direction parallel to the central axis of the burner. Therefore, it is possible to form the optimal flame without inhibiting the diffusion effect for the raw material powder due to the powder diffusion plate 2 and the raw material diffusion chamber 4A. In the aforementioned prior arts, oxygen is ejected in a convergent direction on the central axis of the burner from the oxygen ejection holes of the oxygen supply path that is disposed around the most outer circumference of the burner. This is because the raw material powder, fuel, and oxygen are converged within the narrow space to thereby improve the combustion efficiency. However, in this ejection method, the aforementioned diffusion effect could be inhibited, Therefore, in the present invention, it is important that the ejection direction of oxygen is not converged on the central axis of the burner.

In addition, the flow rates of the oxygen gases ejected from the first oxygen ejection holes 6B and the second oxygen ejection holes 7B, can be independently regulated, and therefore, the combustion state can be optimally adjusted during the production of the spheroidized particles.

For example, when the ratio of oxygen ejected from the first oxygen ejection holes 6B is lower than the ratio of oxygen ejected from the second oxygen ejection holes 7B, it become slow to mix fuel ejected from the fuel ejection holes 5B and oxygen ejected from the first oxygen ejection holes 6B. For this reason, the linearity of the flame is enhanced, and it is possible to form the comparatively long flame. Therefore, the retention time of the particles within the flame can be elongated, and the heating time of the particles can be elongated. As a result, the vitrification percentage of the raw material powder can be improved.

Herein, the vitrification percentage means the ratio of the amorphia quantity of a spheroidized particle to the amorphia quantity of raw material powder.

Conversely, when the ratio of oxygen ejected from the first oxygen ejection holes 6B is higher than the ratio of oxygen ejected from the second oxygen ejection holes 7B, it is enhanced to mix fuel ejected from the fuel ejection holes 5B and oxygen ejected from the first oxygen ejection holes 6B, and the flow of oxygen ejected from the second oxygen ejection holes 7B becomes slow. For these reasons, it is possible to form the comparatively short flame that has a lot of rotational component. Therefore, the retention time of the particles within the flame can be shortened, and the fusion of the particles can be suppressed. As a result, it is possible to obtain the spheroidized particles that have the almost same particle diameter as the raw material powder.

Accordingly, in the present invention, various types of spheroidized particles can be produced according to the intended use.

Figure 3:
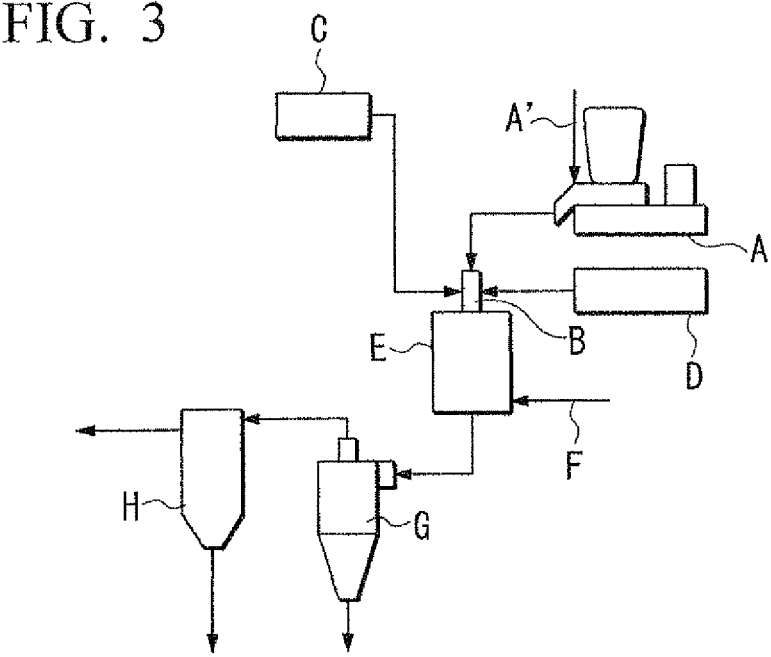
FIG. 3 is a schematic diagram representing a production apparatus of inorganic spheroidized particles of the present invention.

In the production apparatus of the inorganic spheroidized particles, the burner of the present invention is disposed at the top part of the vertical furnace E of the production apparatus as shown in FIG. 3 so that the combustion chamber 4A is in a vertically downward direction, and the cyclone G and the bag filter H are disposed at a downstream side of the vertical furnace E. According to the production apparatus of the inorganic spheroidized particles of the present invention, the raw material powder cut off from the raw material feeder A is supplied into the burner B and spheroidized in the vertical furnace F, and the spheroidized particles are collected by the cyclone G and the bag filter H. Therefore, it is possible to obtain the spheroidized particles that have the almost same particle diameter as the raw material powder, and it is possible to prevent the decrease in spheroidizing quantity.

The production method of the inorganic spheroidized particles of the present invention uses the burner and the production apparatus of the present invention to produce the spheroidized particles, and the production process of the spheroidized particles is described above.

As described in Examples below, when the flow rate ratio of the primary oxygen is adjusted lower than 50%, it is possible to obtain the inorganic spheroidized particles whose vitrification percentage is 98% or more. Therefore, in the present invention, it is preferable that the flow rate ratio of the primary oxygen be adjusted lower than 50%.

EXAMPLES

Hereinafter, the present invention is described in details with reference to Examples, but is not limited to these Examples.

The burner of the present invention shown in FIG. 1 and FIG. 2 was disposed at the top part of the vertical furnace E of the production apparatus of the inorganic spheroidized particles shown in FIG. 3, and the raw material powder cut off from the raw material feeder A was supplied into the burner B and spheroidized in the vertical furnace E.

Specifically, as raw material powder, the silica powder at 20 kg/h was flowed with the oxygen (carrier gas) at 7.5 $Nm^3/h$, and introduced from the raw material supply path 1A through the powder diffusion plate 2 into the raw material diffusion chamber 4A. Also, LPG was introduced as a fuel gas at 5 $Nm^3/h$ from the fuel supply path 5A into the combustion chamber 8, and the oxygen was introduced at 20 $Nm^3/h$ from the primary oxygen supply path 6A and the secondary oxygen supply path 7A into the combustion chamber 8. Then, the raw material powder was flowed into the flame made by the fuel gas and the oxygen so as to produce the spheroidized particles. The produced spheroidized particles were collected by the cyclone G and bag filter H.

Herein, the oxygen from the primary oxygen supply path 6A and the secondary oxygen supply path 7A means the sum of the primary oxygen (the oxygen ejected from the first oxygen holes 6B) and the secondary oxygen (the oxygen ejected from the secondary oxygen holes 7B), and does not include the oxygen of the carrier gas that carries the silica powder.

During the production, the supply quantity ratio between the primary oxygen and the secondary oxygen was changed within the range of the primary oxygen of 0% to 100%, namely the secondary oxygen of 100% to 0%, and the condition was investigated in which the vitrification of 98% or more could be achieved.

Figure 4:
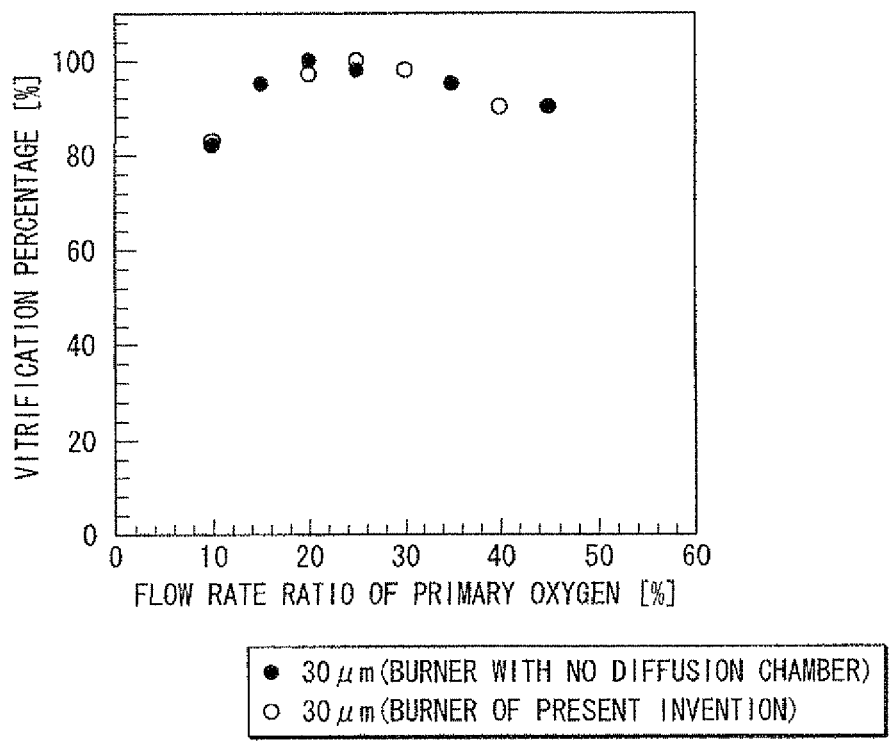
FIG. 4 is the graph representing the relationship between the flow rate ratio of primary oxygen and vitrification percentage in Examples.

FIG. 4 is the graph representing the relationship between the ratio of the primary oxygen and the vitrification percentage when the mean particle diameter of the raw material powder was 30 μm. From this graph, it was found that the optimal vitrification percentage was obtained when the ratio of the primary oxygen was 25%.

Figure 5:
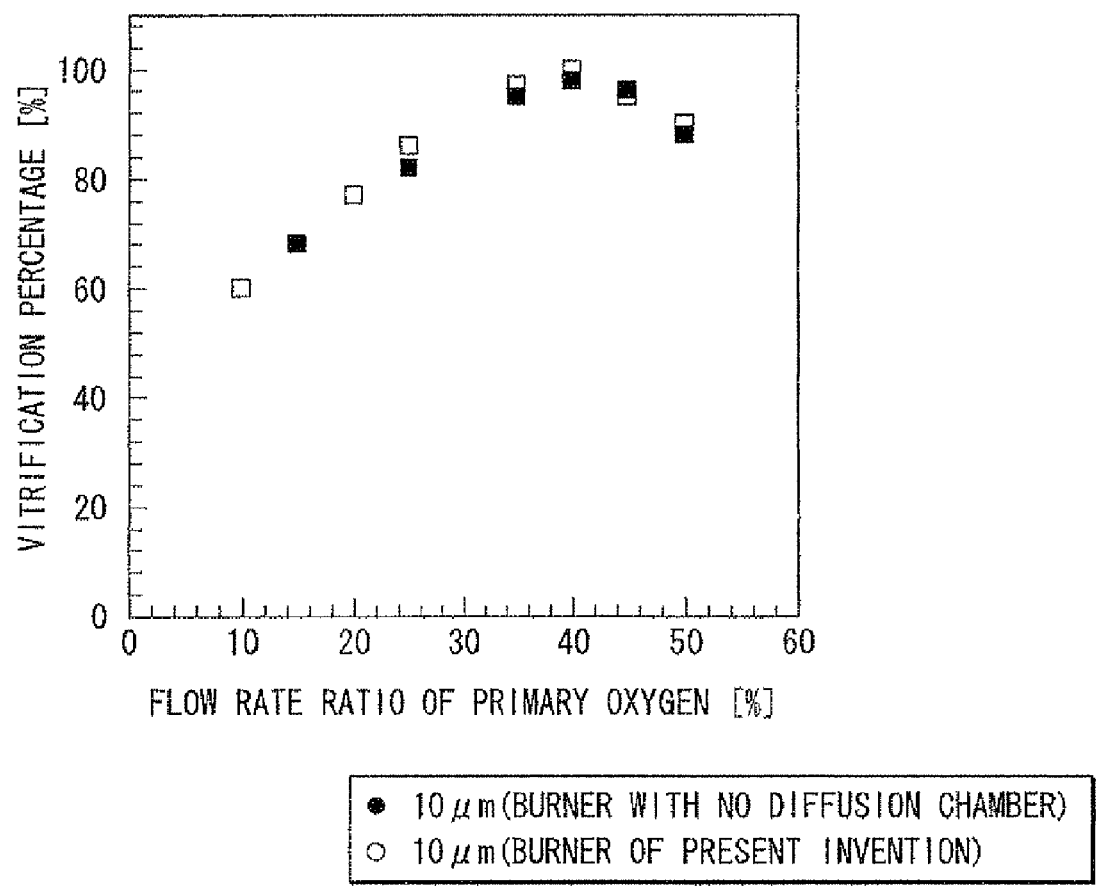
FIG. 5 is the graph representing the relationship between the flow rate ratio of primary oxygen and vitrification percentage in Examples.

FIG. 5 is the graph representing the relationship between the ratio of the primary oxygen and the vitrification percentage when the mean particle diameter of the raw material powder was 10 μm. From this graph, it was found that the optimal vitrification percentage was obtained when the ratio of the primary oxygen was 40%, From the above results, it was found that the ratio between the primary oxygen and the secondary oxygen has an optimal value according to the mean particle diameter to achieve a vitrification percentage of 98% or more. In addition, it was found that the optimal ratio slightly varies according to the mean particle diameter of the raw material powder. When the mean particle diameter was within a range of 10 to 50 μm, the vitrification percentage of 98% or more could not be obtained with the condition of the primary oxygen of 50% or more (the secondary oxygen of 50% or less), In other words, it was found that the vitrification percentage of 98% or more can be obtained with the condition of the primary oxygen of 50% or less (the secondary oxygen of 50% or more).

As Comparative Examples, the same examinations as the aforementioned Examples were performed by using the burner disclosed in Patent Document 4 which did not have the diffusion chamber. This burner had the almost same structure as the burner of the present invention except for no diffusion chamber. The experimental results are shown in FIG. 3 and FIG. 4. From these graphs, it was found that the burner disclosed in Patent Document 4 showed the almost same tendency as the burner of the present invention.

Next, the spheroidized particles were produced using the respective burners and the same raw material powder with the condition of the optimal ratio between the primary oxygen and the secondary oxygen for the respective burners, and the mean particle diameters of the obtained spheroidized particles were compared. Table 1 shows the results when the particle diameter of the raw material powder was 30 μm or 10 μm. When the conventional burner was used, the spheroidized particles were obtained which had the larger particle diameter than the raw material powder. Meanwhile, when the burner of the present invention was used, the spheroidized particles were obtained which had the almost same particle diameter as the raw material powder. I

TABLE 1

| Particle Diameter of Raw Material Powder [μm] | Primary Oxygen [%] | Secondary Oxygen [%] | Processing Capacity [kg/h] | Mean Particle Diameter [μm] | |
|---|---|---|---|---|---|
| | | | | Conventional Burner | Burner of Present Invention |
| 30 | 20 | 80 | 20 | 36 | — |
| | 25 | 75 | | — | 31 |
| 10 | 40 | 60 | 20 | 20 | 11 |

From the present Examples, it was found that the spheroidized particles, which have the particle diameter closer to that of the raw material powder than in a prior art, were obtained using the burner of the present invention.

INDUSTRIAL APPLICABILITY

According to the present invention, it is possible to efficiently produce the spheroidized particles that have the almost same particle diameter as the raw material powder. Therefore, the present invention is industrially useful.

The invention claimed is:
1. A burner for production of inorganic spheroidized particles, comprising:
   a raw material powder supply path that supplies raw material powder by using oxygen or an oxygen-enriched air as a carrier gas;
   a powder diffusion plate having a plurality of fine holes, which is provided at a downstream end of the raw material powder supply path;
   a raw material diffusion chamber that is formed in a diffusion pipe provided at a downstream end of the powder diffusion plate;
   a fuel supply path disposed around the outer circumference of the raw material powder supply path;
   an oxygen supply path disposed around the outer circumference of the fuel supply path; and
   a combustion chamber disposed at a downstream side of the raw material diffusion chamber, which has an inside diameter increasing along the downstream direction and communicates with the fuel supply path and the oxygen supply path, wherein the oxygen supply path has a plurality of first oxygen ejection holes that eject oxygen from the side wall of the combustion chamber in such a direction that forms rotational flow in the combustion chamber, and a plurality of second oxygen ejection holes that are disposed at a downstream side of the first oxygen ejection holes and ejects oxygen from the side wall of the combustion chamber in a direction parallel to a central axis of the burner.

2. The burner for production of the inorganic spheroidized particles according to claim 1, further comprising a controller that controls a supply quantity of the oxygen within the oxygen supply path, wherein the oxygen supply path comprise primary oxygen supply path communicating the first oxygen ejection holes and secondary oxygen supply path communicating the second oxygen ejection holes, and
the controller separately controls the supply quantities of oxygen within the primary oxygen supply path and the secondary oxygen supply path.

3. The burner for production of the inorganic spheroidized particles according to claim 1, wherein the fine holes of the powder diffusion plate are formed in a radial manner along the downstream direction.

4. An apparatus for production of inorganic spheroidized particles, comprising:
a vertical furnace that is equipped with a burner for production of the inorganic spheroidized particles at a top part in a vertically downward direction; and
a cyclone and a bag filter that are disposed at a downstream side of the vertical furnace,
the burner comprising:
a raw material powder supply path that supplies raw material powder by using oxygen or an oxygen-enriched air as a carrier gas;
a powder diffusion plate having a plurality of fine holes, which is provided at a downstream end of the raw material powder supply path;
a raw material diffusion chamber that is formed in a diffusion pipe provided at a downstream end of the powder diffusion plate;
a fuel supply path disposed around the outer circumference of the raw material powder supply path;
an oxygen supply path disposed around the outer circumference of the fuel supply path; and
a combustion chamber disposed at a downstream side of the raw material diffusion chamber, which has an inside diameter increasing along the downstream direction and communicates with the fuel supply path and the oxygen supply path, wherein
the oxygen supply path has a plurality of first oxygen ejection holes the eject oxygen from the side wall of the combustion chamber in such a direction that forms rotational flow in the combustion chamber, and a plurality of second oxygen ejection holes that are disposed at a downstream side of the first oxygen ejection holes and ejects oxygen from the side wall of the combustion chamber in a direction parallel to a central axis of the burner.

5. A method for production of inorganic spheroidized particles, comprising using a burner for production of the inorganic spheroidized particles to produce the inorganic spheroidized particles, wherein
a flow rate ratio between a primary oxygen and a secondary oxygen is adjusted so that the flow rate ratio of the primary oxygen is lower than 50%, to obtain the inorganic spheroidized particles whose vitrification percentage is 98% or more,
the burner comprising
a raw material powder supply path that supplies raw material powder by using oxygen or an oxygen-enriched air as a carrier gas;
a powder diffusion plate having a plurality of fine holes, which is provided at a downstream end of the powder diffusion plate;
a fuel supply path disposed around the outer circumference of the raw material powder supply path;
an oxygen supply path disposed around the outer circumference of the fuel supply path; and
a combustion chamber disposed at a downstream side of the raw material diffusion chamber, which has an inside diameter increasing along the downstream direction and communicates with the fuel supply path and the oxygen supply path; and
a controller that controls a supply quantity of the oxygen within the oxygen supply path, wherein
the oxygen supply path has a plurality of first oxygen ejection holes that eject oxygen from the side wall of the combustion chamber in such a direction that forms rotational flow in the combustion chamber, and a plurality of second oxygen ejection holes that are disposed at a downstream side of the first oxygen ejection holes and ejects oxygen from the side wall of the combustion chamber in a direction parallel to a central axis of the burner;
the oxygen supply path comprise a primary oxygen supply path communicating the first oxygen ejection holes and a secondary oxygen supply path communicating the second oxygen ejection holes, and
the controller separately controls the supply quantities of the oxygen within the primary oxygen supply path and the secondary oxygen supply path.

6. A method for production of inorganic spheroidized particles, comprising using an apparatus for production of the inorganic spheroidized particles to collect coarse and fine particles,
the apparatus comprising:
a vertical furnace that is quipped with a burner for production of the inorganic spheroidized particles at a top part in a vertically downward direction,
a cyclone for collecting the coarse particles which is disposed at a downstream side of the vertical furnace,
a bag filter for collecting the fine particles which is disposed at a downstream side of the cyclone,
the burner comprising:
a raw material powder supply path that supplies raw material powder by using oxygen or an oxygen-enriched air as a carrier gas;
a powder diffusion plate having a plurality of fine holes, which is provided at a downstream end of the raw material powder supply path;
a raw material downstream chamber that is formed in a diffusion pipe provided at a downstream end of the powder diffusion plate;
a fuel supply path disposed around the outer circumference of the raw material powder supply path;
an oxygen supply path disposed around the outer circumference of the fuel supply path; and
a combustion chamber disposed at a downstream side of the raw material diffusion chamber, which has an inside diameter increasing along the downstream direction and communicates with the fuel supply path and the oxygen supply path, wherein
the oxygen supply path has a plurality of first oxygen ejection holes that eject oxygen from the side wall of the combustion chamber in such a direction that forms rotational flow in the combustion chamber, and a plurality of second oxygen ejection holes that are disposed at a downstream side of the first oxygen ejection holes and ejects oxygen from the side wall of the combustion chamber in a direction parallel to a central axis of the burner.

* * * * *